July 2, 1946.  O. J. DURAND  2,403,351
SWEEP RAKE
Filed May 5, 1944  3 Sheets-Sheet 2
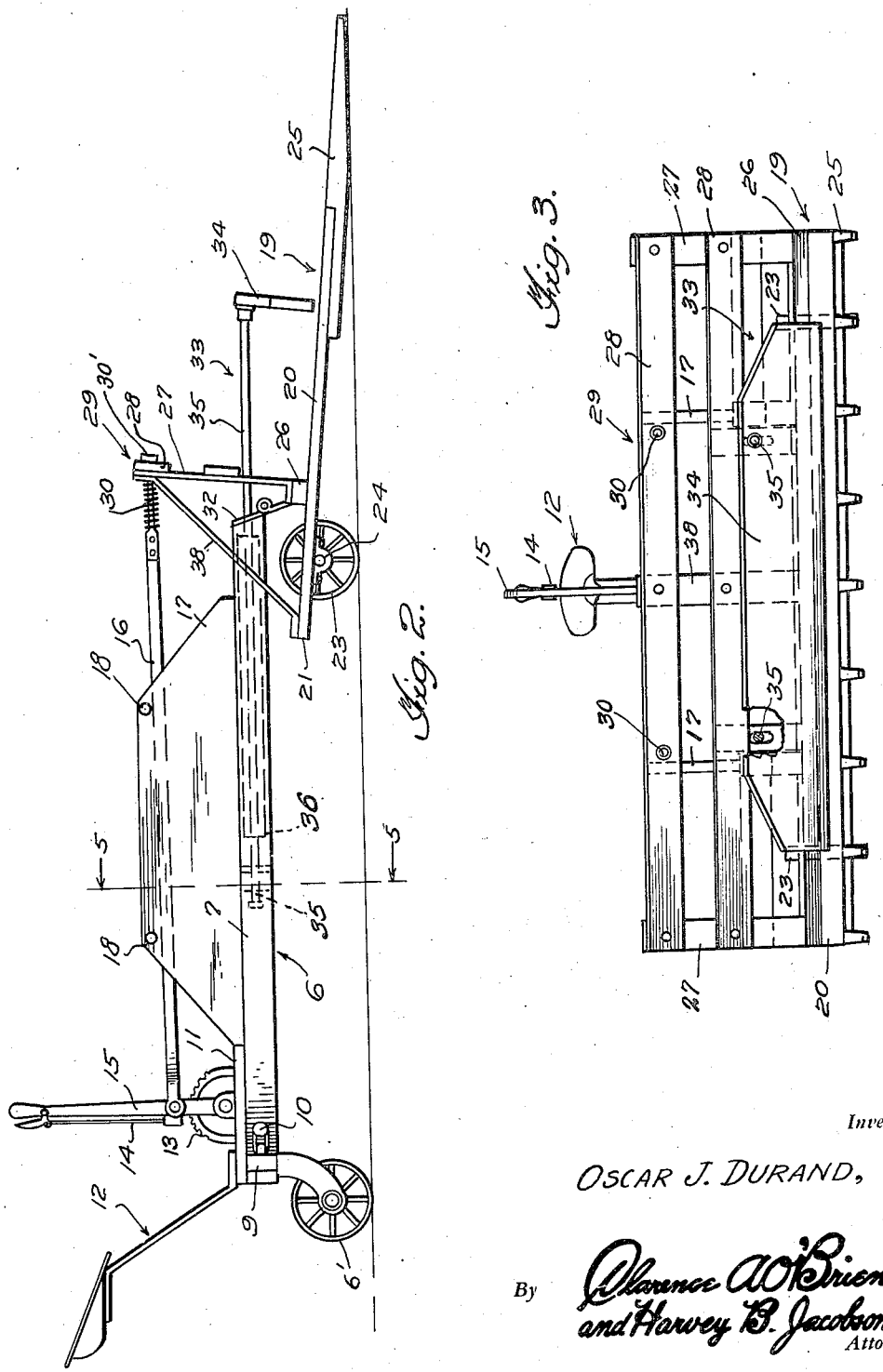
Inventor
OSCAR J. DURAND,
By Clarence A. O'Brien
and Harvey B. Jacobson
Attorneys

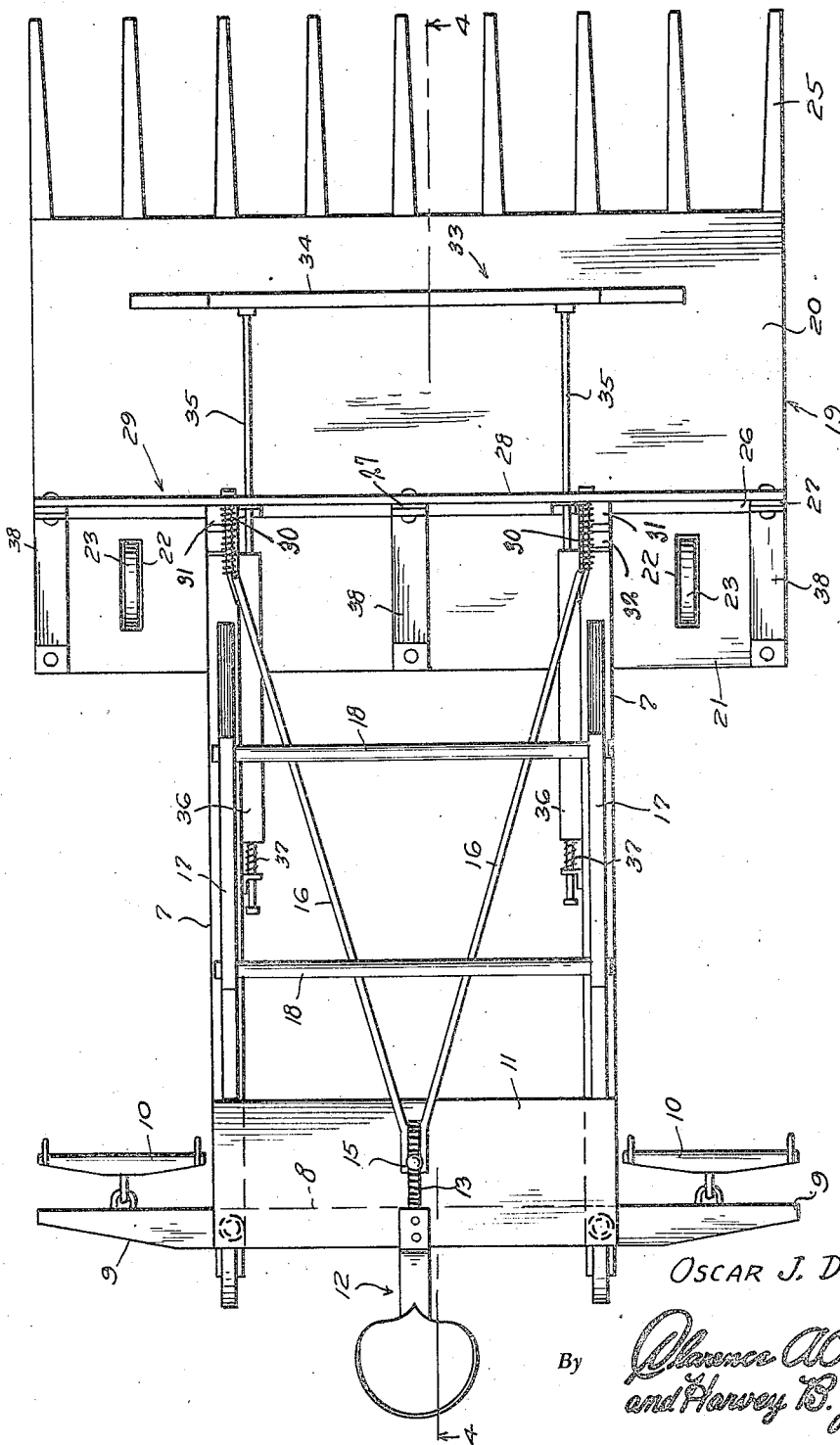

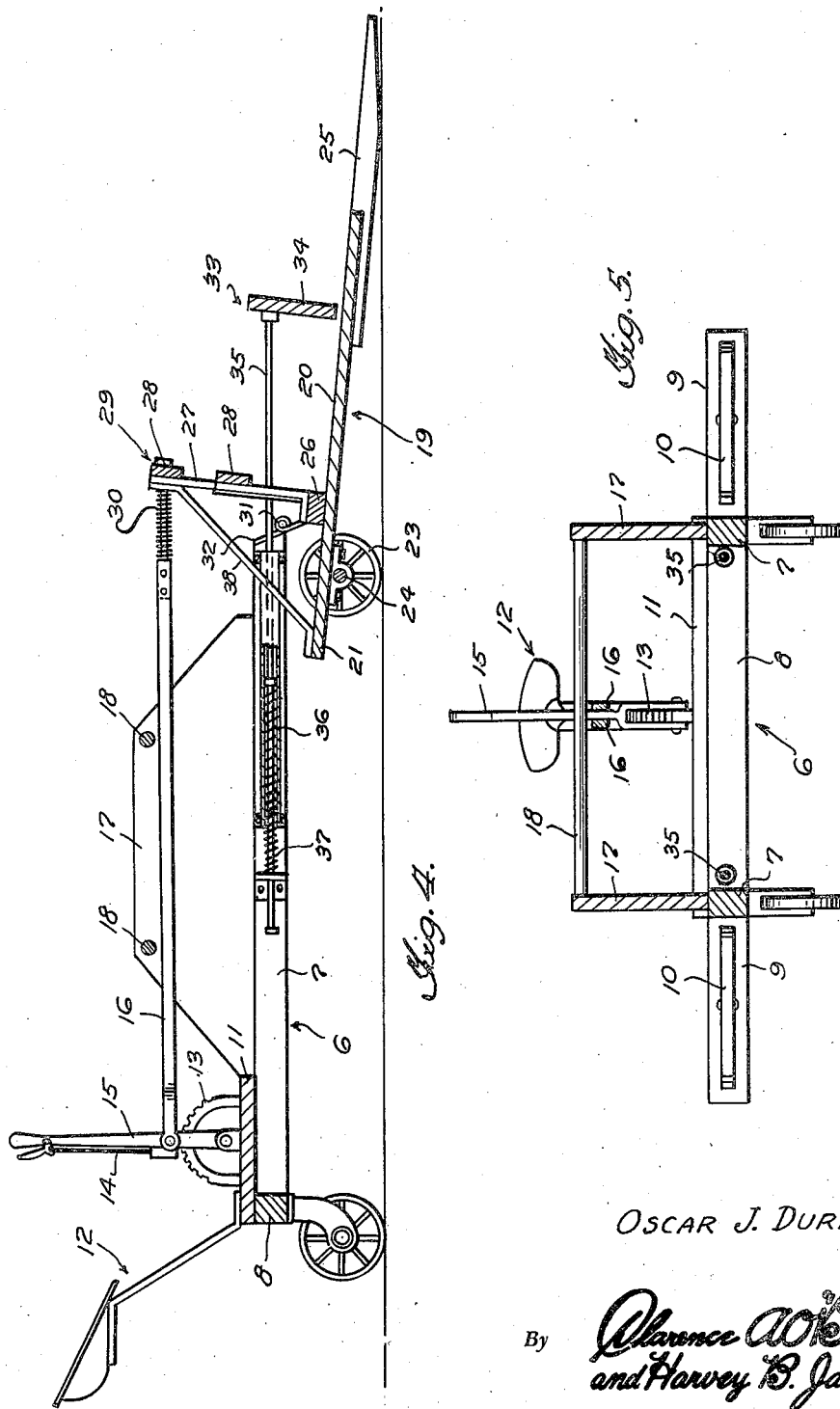

Patented July 2, 1946

2,403,351

UNITED STATES PATENT OFFICE 2,403,351

SWEEP RAKE

Oscar J. Durand, Hall, Mont.

Application May 5, 1944, Serial No. 534,326

1 Claim. (Cl. 56—396)

This invention relates to a novel and improved sweep rake which is suitably and expressly designed for gathering hay, grain and other forage crops while at the same time protecting the gathered load from the brushing and damaging effects of surface stubble, whereby to save the grain and tender leaves of the crops.

A further object is the provision of a portable horsedrawn or other power rake suitable for gathering hay, grain and other forage crops from wet fields without damage, or wetting or injury to the crops from saturated ground.

The invention is also aptly constructed and adapted for gathering sugar beet, potatoes and similar crops in that it serves to lift and then convey the same to piles for convenience in sorting, sacking or other modes of disposal.

Then too, the structure is such as to lend itself adaptable to gathering rocks, stumps and other debris from fields, and then conveniently transporting the same, clear of the surface to points for piling and disposal.

I have found too, that the structure is equally well suited for conveying and loading manure and other refuse from live-stock corrals, feed lots and pens to facilitate cleaning and reconditioning such places.

Other features and advantages of the invention will become more readily apparent from the following description and the accompanying illustrative drawings.

In the drawings, wherein like numerals are employed to designate like parts throughout the same:

Figure 1 is a top plan view of a portable horse-drawn type gathering and sweep rake constructed in accordance with the principles of the present invention.

Figure 2 is a side elevational view of the structural assemblage seen in Figure 1.

Figure 3 is a front elevation, that is, a view observing Figure 2 in a direction from right to left.

Figure 4 is a central vertical or longitudinal sectional view taken approximately on the plane of the line 4—4 of Figure 1.

Figure 5 is a transverse or cross-sectional view taken on the plane of the line 5—5 of Figure 2, looking in the direction of the arrows.

Referring now to the drawings by distinguishing reference numerals it will be seen that the vehicle frame, denoted generally by the numeral 6, is of appropriate material and dimensions and is of general U-shaped form. The frame comprises parallel longitudinal side members 7 and an intervening transverse rear frame member 8. The latter, as brought out in Figure 1, is provided with end extensions 9 serving as appropriate adapters for the singletrees 10. At the rear corners of the frame, there are supporting wheels 6' which are in the form of casters so that the machine may be readily turned. While considering this end of the structure it will be observed that 11 denotes a platform carrying the operator's seat 12. Also, it is provided with a segmental toothed rack 13 to accommodate the trip-pawl 14 which coacts with the rack and is mounted on the lever 15, the lever being suitably forked and pivotally mounted to embrace and coact with the pawl and rack arrangement. The lever serves to operate a pair of diverging stays or bars 16 which extend between and forwardly beyond the upstanding guard panels 17, the latter being appropriately mounted on the side rails 7. The numerals 18 designate rounds or braces arranged between the panels. The panels serve as shields or guards for horses walking on the outside of these, thus protecting the structural mechanism therebetween.

Reference being had now to Figures 2 and 4 it will be observed that at the front of the vehicle is a suitably constructed and adaptable sweep and transporting rake unit, this being denoted by the numeral 19. It comprises a platen formed of metal or other suitable material and the projecting frontal portion thereof may be designated as a gathering apron or shelf 20 and whose rear portion 21 extends beneath the vehicle proper and constitutes an adaptable self-levelling mounting. This underlying or rear end portion 21 is formed with slots 22 (see Figure 1), these slots to accommodate the ground-engaging and transporting wheels 23. The wheels are provided with suitable axles 24 mounted in bearings 24', the upper portions of the wheels projecting through and beyond the slots and the lower portions resting upon the ground. This permits the apron structure to tilt on the wheel axles and allows the front end of the platform to rise and fall for taking on the load or discharging the load as the case may be. It will be noticed that the rake teeth 25 are detachably secured, in any appropriate manner, to the outer edge of the apron and project therebeyond, these being shaped to slide over the surface to pick up the material to be gathered. A horizontal rail or bar 26 extends across the apron toward the rear portion thereof but in advance of the ground-engaging wheels 23. L-shaped uprights or brackets 27 connect thereto, these being provided with spaced slats 28 to provide an open-work back-stop 29 to limit the stacking of material on the rake and to prevent it from pushing back on the machine proper. It will be noticed, in this connection, that the aforementioned stays or braces 16 constitute push-pull links for tilting the rake unit and are provided with cushioning springs 30 coiled about pins 30' fixed to front ends of the braces and slidable through the upper end of the backstop. It will be observed too that the entire unit is connected with the frame 6 by hinged members 31 which have their lower ends secured to the cross-bar 26 and have upper leaves 32 connected to the forward ends of the side rails 7. This provides a suitably hinged suspension for the entire unit which, as before stated, tilts up and down on the axles 24 of wheels 23. Thus, by way of this wheel arrangement, and hinged suspension means and links 16 the unit is lowered to gather the load and elevated to the desired horizontal position to lift the load to clear the ground and to transport it to the desired point of disposal.

The numeral 33 designates a load ejector device comprising an ejector head or plate 34 connected with parallel rods 35 extending slidably through appropriate guide sleeves 36 on the side rails 7. Spring means is provided as at 37, which spring means is pushed back and placed under tension as the load gathers on the rake. In other words, as the load piles on the rake and the rake is tilted up to shift the entire load back, it presses against the ejector, puts the same under spring tension. Then, when the rake is again lowered the spring means 37 comes into play to project the ejector and to assist in discharging, somewhat automatically, the load from the rake.

For the purpose of stabilizing the structure, I provide suitable diagonal braces 38, these being connected at their lower ends to the slotted adapter mount 21 and at their upper ends to the upper portion of the back stop 29.

It is believed that a rake construction of this type is possessed of improvements and advantages, some of which are as follows. It provides for the gathering of hay, grain and other forage crops without loss and damage by carrying the same from place to place and without permitting the load to drag or brush against the ground or surface. It is suitable for gathering crops and miscellaneous materials from wet and swampy land and to thereafter carrying the same, in a plane above the land, in a practicable and convenient manner. In practice, the rake teeth may be appropriately attached in place so that they can be easily repaired when damaged. Unloading is expedited by the provision of the spring actuated ejector or unloading device.

It is to be understood that depending on the work to be performed, the size and proportions of parts will, of course, be varied. Moreover, it is understood that the structure may be operated by a two-horse team, with the horses walking on the outside of the shield panels, or a suitable "Caterpillar" tractor can be adapted for propulsion purposes.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A sweep rake construction of the class described comprising a low slung horizontal frame with swivel supporting wheels at its rear end, an attendant operator's seat supported on said rear end, a segmental rack on said rear end portion, a lever pivotally associated therewith, a pawl mounted on said lever and coacting with said rack, and rake means on the front end of said frame, comprising an apron provided with ground engaging wheels adjacent its rear end on which the apron is fulcrumed, hinges connecting the front end of said frame with said apron in advance of the wheels of the apron, gathering teeth extending forwardly from said apron, an openwork, rack-like back-stop on said apron extending upwardly therefrom in front of said frame, push-pull link connections extending longitudinally of said frame which are connected at their rear ends to the intermediate portion of the lever and pivotally connected at their forward ends to the upper end of said back-stop, and an ejector extending across said apron in advance of the back-stop and having mounting means slidable longitudinally of the frame and yieldably held against rearward movement said last mentioned means including parallel, transversely spaced supporting arms, slidable in guides carried by the spaced sides of the frame, and resilient means at the rearward end of the arms and guides and abutting against portions of the frame.

OSCAR J. DURAND.